(12) United States Patent
Lo et al.

(10) Patent No.: US 9,753,550 B2
(45) Date of Patent: Sep. 5, 2017

(54) OPTICAL ENCODER AND OPERATING METHOD THEREOF

(71) Applicant: PIXART IMAGING INC., Hsin-Chu County (TW)

(72) Inventors: Chung-Wen Lo, Santa Clara, CA (US); Hsin-Chia Chen, Santa Clara, CA (US)

(73) Assignee: PixArt Imaging Inc., Hsin-Chu County (TW)

( * ) Notice: Subject to any disclaimer, the term of this patent is extended or adjusted under 35 U.S.C. 154(b) by 358 days.

(21) Appl. No.: 14/573,023

(22) Filed: Dec. 17, 2014

(65) Prior Publication Data

US 2015/0262361 A1 Sep. 17, 2015

(30) Foreign Application Priority Data

Mar. 13, 2014 (TW) .............................. 103109350 A
May 28, 2014 (TW) .............................. 103118735 A

(51) Int. Cl.
*G06K 9/00* (2006.01)
*G06F 3/03* (2006.01)

(52) U.S. Cl.
CPC ................................. *G06F 3/0312* (2013.01)

(58) Field of Classification Search
CPC .. G06F 3/0312; G03B 15/00; G06K 9/00986; G06K 9/2027; G06K 9/2036; G06K 9/4661; H04N 19/00; H04N 5/2256
See application file for complete search history.

(56) References Cited

U.S. PATENT DOCUMENTS

| | | | | |
|---|---|---|---|---|
| 4,338,518 A * | 7/1982 | Brienza | ................ | G01D 5/2492 250/227.26 |
| 4,642,634 A * | 2/1987 | Gerri | ...................... | G01B 11/00 340/870.02 |
| 6,246,050 B1 * | 6/2001 | Tullis | ..................... | G01D 5/347 250/231.13 |
| 8,598,509 B2 * | 12/2013 | Batchelder | ......... | G01D 5/34715 250/231.13 |
| 2004/0012794 A1 * | 1/2004 | Nahum | .............. | G01D 5/34707 356/620 |
| 2007/0051884 A1 * | 3/2007 | Romanov | ............ | G01D 5/2495 250/231.13 |
| 2011/0220781 A1 * | 9/2011 | Batchelder | ......... | G01D 5/34715 250/231.13 |

FOREIGN PATENT DOCUMENTS

TW 201346610 A 11/2013

* cited by examiner

*Primary Examiner* — Manuchehr Rahmjoo
(74) *Attorney, Agent, or Firm* — Hauptman Ham, LLP

(57) ABSTRACT

The present disclosure is related to an optical encoder which is configured to provide precise coding reference data by feature recognition technology. To apply the present disclosure, it is not necessary to provide particular dense patterns on a working surface or any reference object with particular markers. The precise coding reference data can be generated by detecting surface features of the working surface.

14 Claims, 8 Drawing Sheets

OPTICAL ENCODER AND OPERATING METHOD THEREOF

RELATED APPLICATIONS

The present application is based on and claims priority to Taiwanese Application Number 103109350, filed Mar. 13, 2014 and Taiwanese Application Number 103118735, filed May 28, 2014, the disclosures of which are hereby incorporated by reference herein in their entirety.

BACKGROUND

1. Field of the Disclosure

This disclosure is related to an optical encoder and an operating method thereof that provide precise coding reference data by feature recognition technology. The precise coding reference data can be generated by detecting surface features of a working surface without providing particular dense patterns on the working surface or any reference object with particular markers.

2. Description of the Related Art

Conventionally, means for optical encoding generally needs to process a working surface to have markers with a specific density for reflecting light or light penetration. Or the encoding is implemented by arranging light sources in a particular way or controlling the light emitting sequence. For example, U.S. Pat. No. 8,598,509 discloses a plurality of light sources for emitting light in a particular sequence as well as an encoded working surface with predetermined gaps such that the light can penetrate the gaps in a predetermined manner to be detected by a photodetector. The detection result is used to generate the coding reference data, e.g. position data or velocity data of some elements in the system.

However, in this conventional technology a special processing has to be performed on the working surface previously such that the application thereof is limited. Meanwhile, in order to obtain an accurate detection result, the processing of the working surface becomes complicated so that the difficulty of applying this technology also becomes higher.

SUMMARY

The present disclosure provides an optical encoder including a light emitting unit, a light sensing unit, a memory unit and a processing unit. The light emitting unit is configured to emit light to a detection surface to be recognized, and the light sensing unit is configured to detect reflected light from the surface to generate detected signals. The processing unit is configured to generate the frame processing result according to the detected signals, which are stored in the memory unit, to be served as a basis of the following encoding process. The frame processing includes one or a combination of the digital filtering, image enhancement, edge extraction, digitization or binarization, but not limited thereto. The optical encoder may have relative motion with respect to the surface, and the light sensing unit, in cooperation with the light emitting unit, may generate the detected signals at a high frame rate. When the frame rate is higher, a higher relative speed is detectable.

The present disclosure further provides an optical encoder including a light emitting unit, a light sensing unit and a processing unit. The light emitting unit is configured to emit light to a detection surface. The light sensing unit is configured to detect reflected light from the detection surface to generate detected signals. The processing unit is configured to store reference data corresponding to at least one reference position in a registration mode according to the detected signals, and generate comparison image data according to the detected signals in a comparison mode and compare the comparison image data with the reference data to determine a current position.

The present disclosure further provides an operating method of an optical encoder. The optical encoder includes a light sensing unit configured to detect reflected light from a detection surface to generate detected signals and a processing unit configured to process the detected signals. The operating method includes the steps of: entering a registration mode in which the processing unit stores reference data corresponding to at least one reference position according to the detected signals; and entering a comparison mode in which the processing unit generates comparison image data according to the detected signals and compares the comparison image data with the reference data to determine a current position.

The present disclosure further provides an optical encoder including a light emitting unit, a light sensing unit and a processing unit. The light emitting unit is configured to emit light to a detection surface. The light sensing unit is configured to detect reflected light from the detection surface to generate images. The processing unit is configured to, in a registration mode, identify a start position repeatedly detected according to the images to determine an operation range; and store reference data corresponding to an original position and at least one reference position within the operation range.

In one aspect, the processing unit is configured to identify the original position and the at least one reference position of the operation range according to a moving vector, a moving distance, a rotation angle or a rotation time.

In one aspect, the processing unit is configured to calculate a position difference between the comparison image data and the reference data to accordingly correct an accumulated error.

In one aspect, the processing unit is configured to identify positions at which a difference value between the comparison image data and the reference data exceeds an identification threshold as unidentified positions.

To achieve the above objects, at least one frame of image having features is recorded in the memory unit to be served as a reference basis in the following encoding process. Especially in the position correction function, an original position can be precisely set or a user may arbitrarily set the reference position according to the requirement. The image having features may be generated by forming markers on the detection surface for being detected by a sensing unit or by detecting surface features using the sensing unit.

The optical encoder of the present disclosure stores at least one frame of image having features or a processed image for indicating a specific position. Accordingly, when the optical encoder captures the image again, a position difference between the two images is reported by using the algorithm for being used by a system adopting the optical encoder. The system then fine tunes the position of the hardware so as to maintain a high accuracy.

When a detection surface has marks for being detected by a sensing unit, features of the markers, e.g. the size and the feature position, have to be arranged in cooperation with the size and the resolution of the sensing unit of the optical encoder as well as the disposed position of the optical encoder. Briefly speaking, the size of the sensing unit has to cover at least the frame formed by the light reflected from the features of the markers, and the resolution of the sensing unit has to be able to identify the features in the frame.

DETAILED DESCRIPTION OF THE EMBODIMENT

Figure 1:
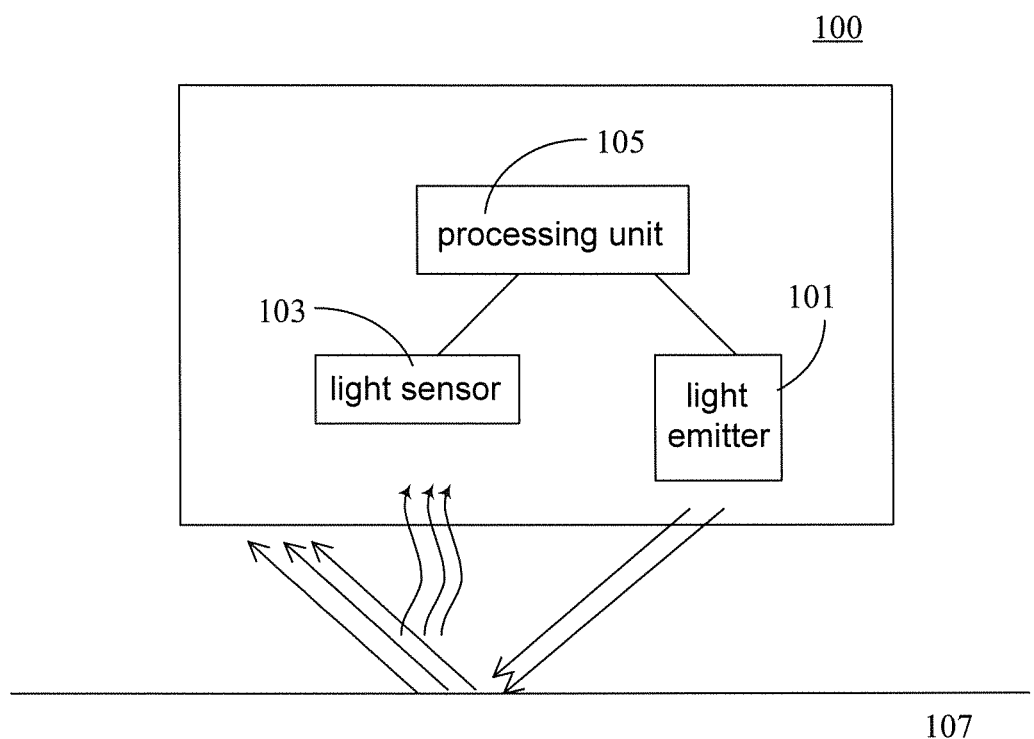
FIG. 1 is one embodiment of the present disclosure.

The descriptions below include some embodiments of the present disclosure and schematic diagrams of user's operation for understanding how the present disclosure is applied to actual operating conditions. It should be noted that in the drawings below elements not related to the technology of the present disclosure are omitted. Meanwhile, in order to clearly show the relationship between elements, the scale of elements in the drawings may not be identical to its actual scale.

FIG. 1 is one embodiment of the present disclosure. The optical encoder 100 includes a light emitting unit 101, a light sensing unit 103 and a processing unit 105. The light emitting unit 101 is configured to emit light to a detection surface 107, and the light sensing unit 103 is configured to detect reflected light from the detection surface 107 to generate detected signals. The processing unit 105 is configured to process the detected signals and generate frame identification results, and the frame processing results are stored, for example, in a memory integrated in the processing unit 105 or stored in the hardware outside of the optical encoder through a transmission interface for being accessed in the following controlling and comparison processes.

Figure 1A:
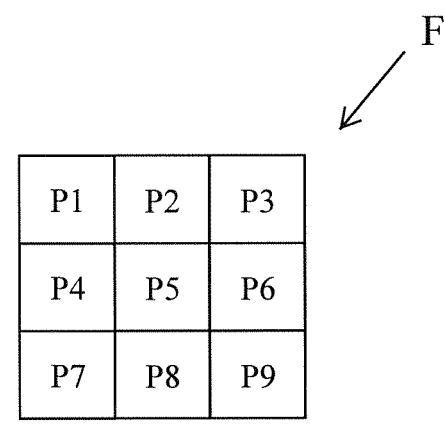
FIG. 1a is a schematic diagram of an image captured by the light sensing unit of FIG. 1.

Referring to FIG. 1a, it is a schematic diagram of an image F, which includes 9 pixels P1 to P9, captured by the light sensing unit 103. However, the pixel number is only intended to illustrate but not to limit the present disclosure. In one embodiment, the processing unit 105 calculates a gray value difference between adjacent pixels in the image F. For example, the processing unit 105 compares gray value differences between each pixel and all pixels adjacent thereto with a difference threshold, and when one gray value difference exceeds (larger than or equal to) the difference threshold, a count value is added by 1 whereas when one gray value difference is smaller than the difference threshold, the count value is added by 0 or maintained unchanged. For example, the processing unit 105 calculates the gray value difference respectively between pixels P2, P4, P5 and the pixel P1 and compares these gray value differences with the difference threshold, calculates the gray value difference respectively between pixels P1, P3 to P6 and the pixel P2 and compares these gray value differences with the difference threshold and so on. Accordingly, the processing unit 105 may obtain a count value associated with every pixel P1 to P9, and these count values are stored as a digital value. In another embodiment, the processing unit 105 calculates a gray value difference between two groups of pixels, e.g. a gray value sum of pixels P1 and P9, a gray value sum of pixels P3 and P7, and when a difference of sum between these two gray value sums exceeds a difference threshold, a digital value "0" may be designated and stored whereas when the difference of sum is smaller than the difference threshold, a digital value "1" may be designated and stored. In other embodiments, an average gray value of gray values of each pixel and all pixels adjacent thereto may be stored as a digital value. The above stored data is configured as reference data for being accessed in the following controlling and comparison processes. It is appreciated that the reference data of an image being stored is not limited to those described in the present disclosure as long as the image feature can be identified.

It should be noted that according to the design of the optical mechanism, the light emitting unit 103 and the light sensing unit 101 may be arranged in various ways. For example, the two units may be arranged symmetrically to a normal line of a reflective surface such that the light sensing unit 103 may receive the reflected light in an angle symmetrical to that of the light emitting unit 101 emitting light (e.g. referred as a bright field arrangement). Or the light sensing unit 103 may be arranged above the detection surface 107 illuminated by the light emitting unit 101 so as to receive scattered light from the detection surface 107 (e.g. referred as a dark field arrangement). The optical encoder 100 may have a relative motion with respect to the detection surface 107. The detection surface 107 is adaptable to various fields such as the control knob including a volume control knob, a temperature control knob, a moisture control knob and various equipment knobs, or the linear control including the position control of a printer nozzle, the position control of an audio pickup head, the rearview mirror control and the chair back angle adjustment, but not limited thereto. These applications have the feature that an original position or multiple reference positions need to be precisely defined. In the optical encoder 100, frame processing results corresponding to the original position and every reference position are stored and used as the reference data associated with these positions.

Figure 2A:
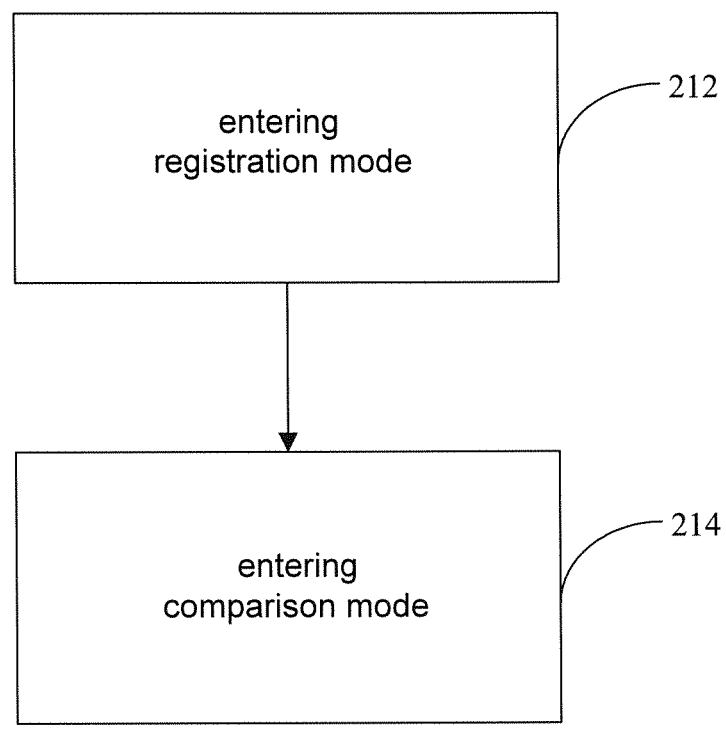
FIGS. 2a to 2e are flow charts of the present disclosure.

FIGS. 2a, 2b, 2c, 2d and 2e are flow charts of an operating method in applying the present invention. FIG. 2a shows that in applying the present invention, the optical encoder enters a registration mode 212 at first and then enters a comparison mode 214. In the registration mode 212, the optical encoder records at least one detected signal which is then frame identified to be served as the reference data. For example, the processing unit 105 stores the reference data associated with at least one reference position according to the detected signal. In the comparison mode 214, the optical encoder compares a frame identification result with the reference data so as to identify whether the optical encoder is at the position corresponding to the reference data, e.g. the original position or one of a plurality of reference positions mentioned above. For example, the processing unit 105 generates comparison image data according to the detected signal, and compares the comparison image data with the reference data so as to determine a current position.

The circular relative motion between the optical encoder 100 and the detection surface 107 is taken as an example herein, and the linear relative motion between the optical encoder 100 and the detection surface 107 is similar thereto, e.g. taking one end or the center of a linear region as an original position.

Figure 2B:
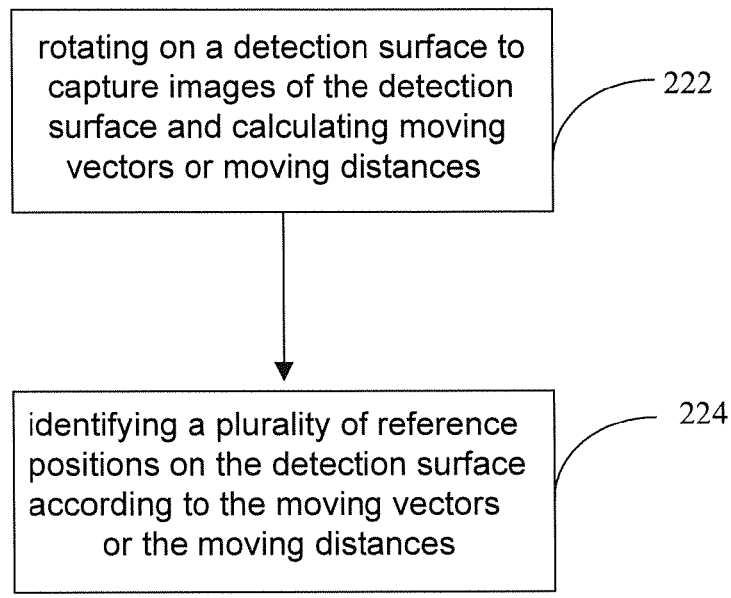

FIG. 2b further explains one embodiment of a registration mode, and the optical encoder 100 rotating on the detection surface 107 is taken as an example herein. In the registration mode, in the step 222 the optical encoder 100 rotates on the detection surface 107 to capture images of the detection surface 107 and calculates moving vectors or moving distances till a start position is returned. For example, the processing unit 105 calculates difference values between the reference data associated with a start position and the reference data of the followed every image, and when the image has the smallest difference value appears again, it means that the start position is returned. A range between the start position being repeatedly detected is referred to an operation range. Then in the step 224, the optical encoder rotates continuously and identifies a plurality of reference positions (e.g. including the original position and at least one reference position) on the detection surface (e.g. the operation range) according to the moving vectors or moving distances, and detected signals associated with predetermined positions are recorded as reference data. For example, a plurality of positions may be equally identified on the detection surface 107 according to the moving vectors or moving distances within one circle rotation, and the detected signal is recorded when the optical encoder passes each of the positions to be served as the reference data associated with every reference position. Furthermore, in FIG. 2b an operation range is determined by repeatedly recognizing an identical start position, and then the operation range is equally or unequally divided using the moving vectors or moving distances.

The purpose of using the moving vectors or moving distances as the dividing reference is due to the non-uniform motion between the optical encoder 100 and the detection surface 107 in the process of constructing the reference data of the original position and multiple reference positions. In order to equally divide the operation range on the detection surface 107, the moving vectors or moving distances are served as the dividing reference. In another embodiment, when the relative motion between the optical encoder 100 and the detection surface 107 is a uniform motion (e.g. by electronic automatic control), the detection surface 107 may be divided equally or unequally according to a rotation time or a rotation angle for one circle rotation. In other words, FIG. 2b shows that an operation range is divided using a moving vector, a moving distance, a rotation angle or a rotation time, and the reference data corresponding to every reference position is stored. The registration mode may be executed before shipment of the optical encoder 100, by user's selection or when the update of the reference data is identified necessary by the system itself, so as to store the reference data corresponding to the original position and every reference position.

Figure 2C:
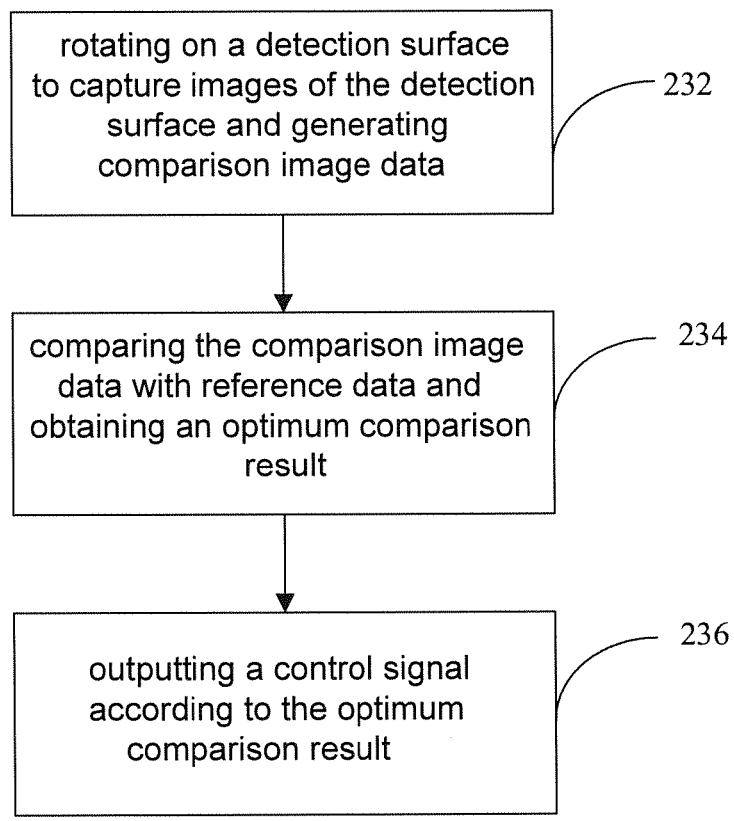

FIG. 2c further explains one embodiment of a comparison mode. Referring to steps of FIG. 2b together, in the step 224 of FIG. 2b, the optical encoder has generated the reference data of a plurality of positions (e.g. including the original position and reference positions). In the comparison mode, the optical encoder 100 rotates on the detection surface 107. In the step 232, the optical encoder 100 captures images of the detection surface 107 during rotation and accomplishes the frame processing, e.g. image filtering and digitizing, so as to obtain the comparison image data. It is appreciated that the process for generating the comparison image data is preferably identical to that for generating the reference data, e.g. calculating the gray value difference or average gray value of pixels as mentioned above for being compared in the following processes. Then in the step 234, the optical encoder 100 compares the comparison image data with the reference data and obtains an optimum comparison result. For example, the comparison result is compared with at least one threshold so as to obtain a digitized comparison result, the maximum comparison result exceeding the threshold or the minimum comparison result lower than the threshold is referred as the optimum comparison result to be associated with a current position. For example in one embodiment, the difference value between the comparison image data and a plurality of reference data is respectively calculated, and whether the difference value between the comparison image data and the reference data is smaller than a threshold is identified, wherein for example calculating a difference value between gray value differences or average gray values of the comparison image data and that of the reference data. Finally in the step 236, a current position of the optical encoder 100 corresponding to the reference data is identified according to the optimum comparison result and the signal is outputted. In other embodiments, the comparison result may be generated through other ways. For example, the optical encoder may take a first accurate reference data in the comparing process as the optimum comparison result. Said threshold may be a predetermined threshold or dynamically adjusted with the system operation.

Figure 2D:
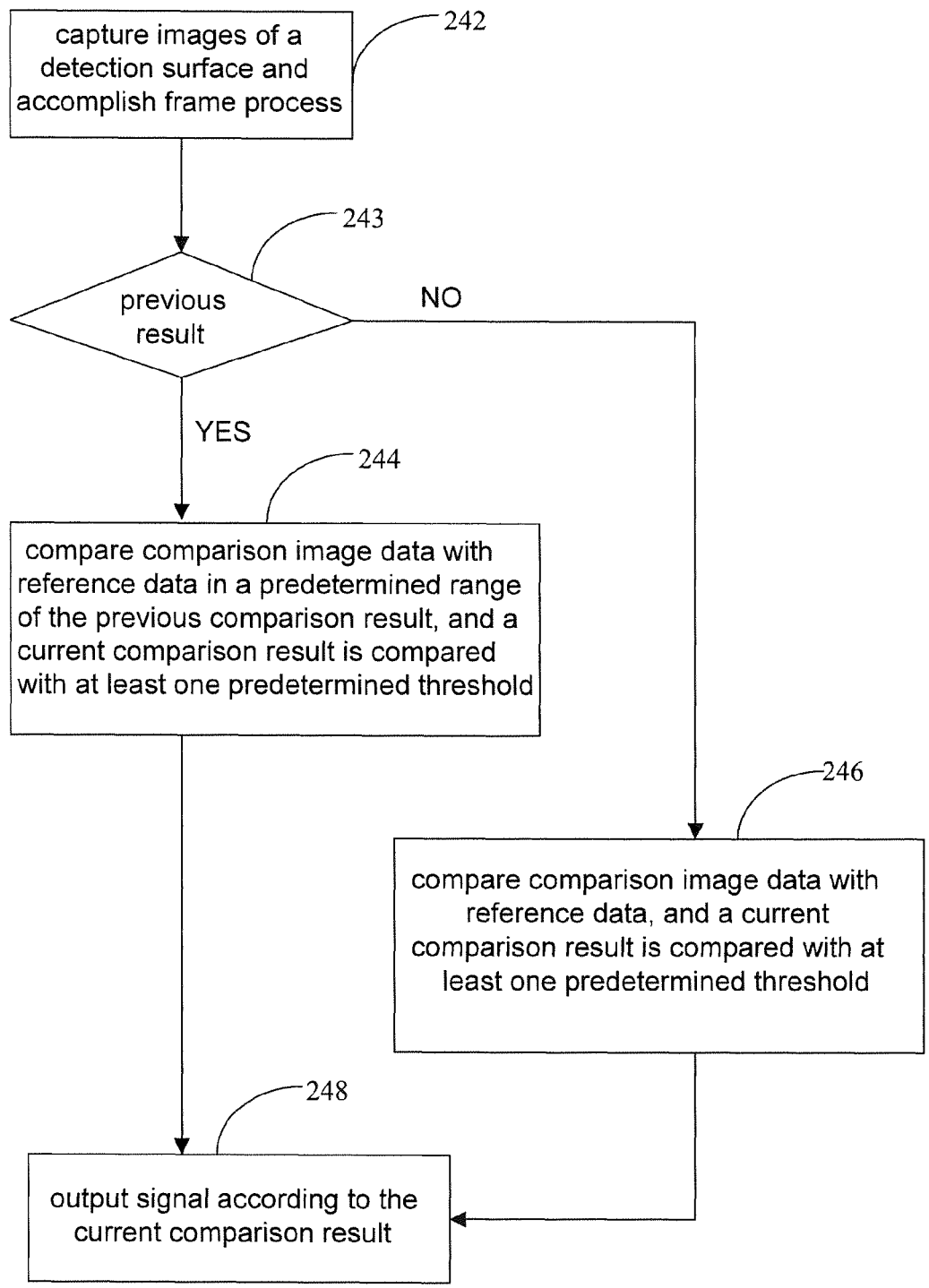

FIG. 2d further explains one embodiment of a comparison mode with reduced power. According to a previous comparison result, a range of the reference data to be compared is reduced so as to achieve the power saving. In the step 242, the optical encoder 100 captures images of the detection surface 107 and accomplishes the frame processing to generate the comparison image data. In the step 243, the optical encoder 100 firstly identifies whether a previous comparison result exists to be served as a basis in the following comparing process. If a previous comparison result exists, the reference data in a predetermined range is retrieved from a reference data range represented by the previous comparison result. And in the step 244, the comparison image data is compared with the reference data within the predetermined range of the previous comparison result, and a current comparison result is compared with at least one threshold. For example, if the previous comparison result is an angle, only a part of reference data within a predetermined angle range close to said angle is compared. This method may limit the compared range close to the previous comparison result such that the comparing process is not performed with all the reference data so as to reduce the calculating amount thereby saving the power and comparison time. Said predetermined range may be adjusted according to the system requirement. If it is necessary to obtain the current comparison result quickly, the predetermined range may be reduced, or vice versa. Then in the step 248, the signal is outputted according to the current comparison result. If the previous comparison result does not exist, then in the step 246 the comparison image data is compared with all the reference data and a current comparison result is then compared with at least one threshold so as to obtain an optimum comparison result, similar to the step 234 shown in FIG. 2c.

Figure 2E:
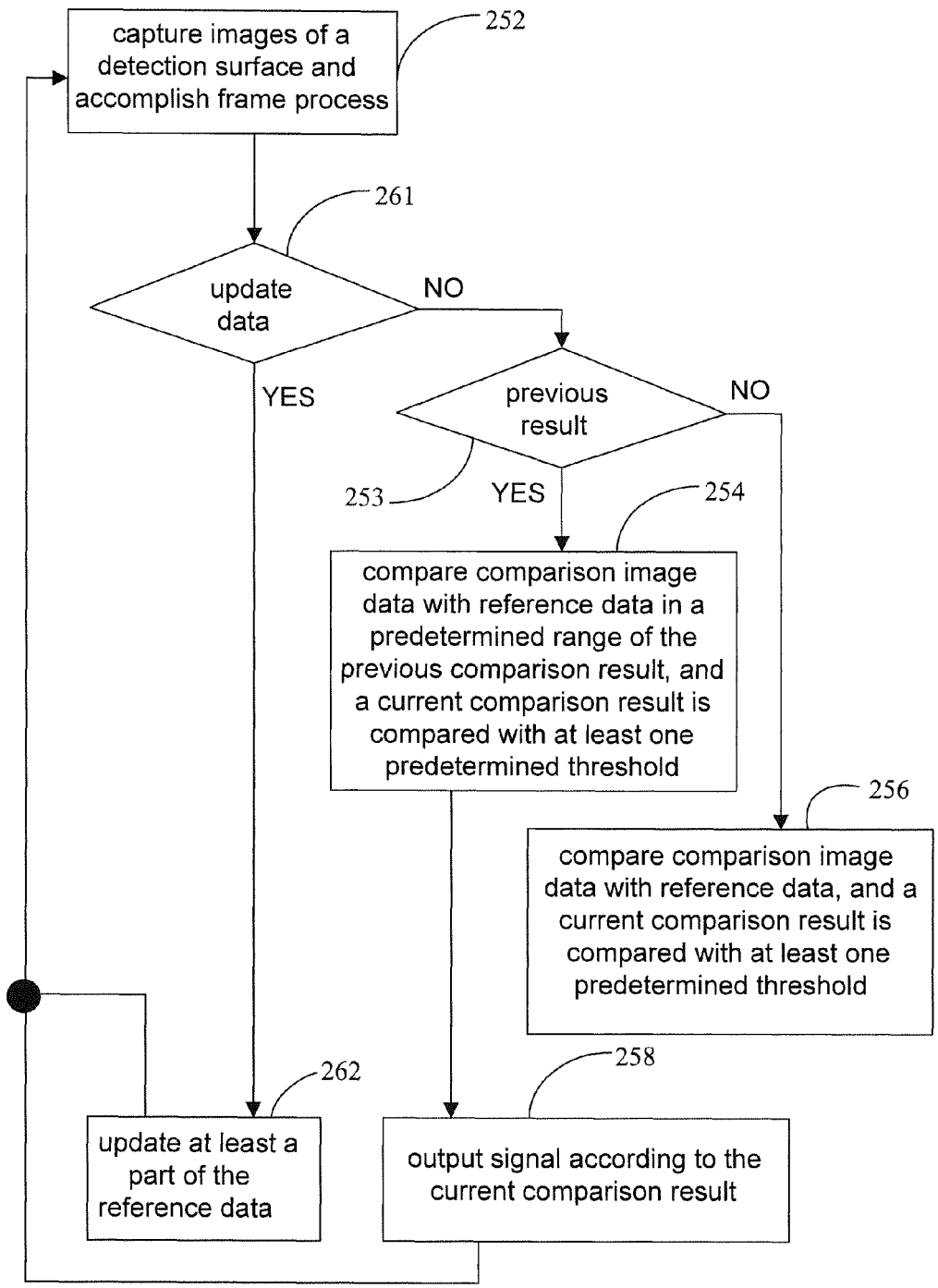

FIG. 2e further explains one embodiment of a comparison mode with contamination resistant and higher stability. According to the previous comparison result, it is able to determine whether to update at least a part of the reference data range so as to realize the contamination resistant and higher stability. After being used for some time, the hardware may be damaged and the detection surface 107 may be polluted to cause the interference to the image capturing of the optical encoder. It is able to realize the contamination resistant and higher stability by updating the reference data. When the contamination is formed on the detection surface 107, the contamination may be treated as a part of features of the detection surface 107 different from positions. When the contamination is formed on the optical encoder 100, a fixed interference is formed to influence every image. The above two interferences may be eliminated by updating the reference data range. In the step 252, the optical encoder 100 captures images of the detection surface 107 and accomplishes the frame processing so as to generate the comparison image data. In the step 261, the optical encoder 100 firstly identifies whether it is necessary to update the reference data (described below). It the reference data needs to be updated, then after at least a part of the reference data is updated in the step 262, the step 252 is then executed continuously. If the reference data needs not to be updated, then in the step 253 the optical encoder firstly identifies whether a previous comparison result exists to be served as a basis in the following comparing process. If a previous comparison result exists, the reference data in a predetermined range is retrieved from the reference data range represented by the previous comparison result. And in the step 254, the comparison image data is compared with the reference data within the predetermined range of the previous comparison result, and a current comparison result is compared with at least one threshold. Then in the step 258, a control signal is outputted according to the current comparison result and whether to update a part of the reference data is determined, and then the step 252 is executed continuously. If the previous comparison result does not exist, then in the step 256 the comparison image data is compared with all the reference data and a current comparison result is compared with at least one threshold so as to obtain an optimum comparison result, similar to the step 234 shown in FIG. 2c.

In one embodiment, when all the comparison results do not fulfill the condition limited by the threshold, e.g. the difference value between the comparison image data and the reference data is always larger than or smaller than a threshold, it means that the fixed noise in the captured images is high enough to influence the detection result such that this may be arranged as a condition for updating at least a part of the reference data.

Figure 3A:
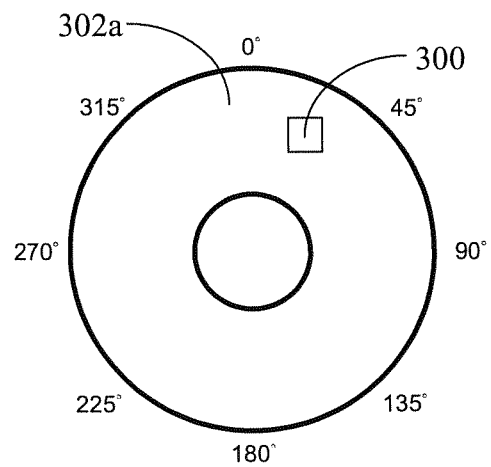
FIGS. 3a and 3b are upper views of a working surface respectively without any marker and a few markers to which the present invention applies.
Figure 3B:
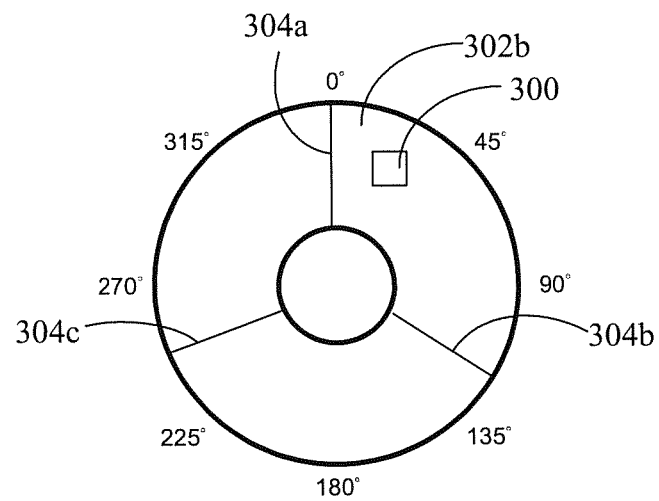

Referring to FIGS. 3a and 3b, wherein FIG. 3a is an upper view of the detection surface 302a without any marker to which the present disclosure applies, and FIG. 3b is an upper view of the detection surface 302a with markers to which the present disclosure applies. In FIG. 3a, the optical encoder is applied to a knob control, and the optical encoder 300 rotates with respect to the detection surface 302a, e.g. one of the optical encoder 300 and the detection surface 302a being combined with the rotating mechanism of a knob and the other one is kept steady. In this manner, when the knob is rotated, a relative rotation occurs between the two elements.

As shown in FIG. 3a, the optical encoder 300 directly detects surface features on the detection surface 302a and generates the frame identification result. Generally, the surface made of any kind of material has more or less rugged textures. Therefore, when the optical encoder 300 emits light to the detection surface 302a, reflected light from the detection surface 302a generates bright and dark patterns according to the features of the material surface. And these textures are different from position to position and generally do not repeatedly appear, and thus different textures can be detected at different positions of the detection surface 302a. It order to prevent errors due to similar patterns contained in the detected surface image, the examination and extraction processes may be performed in the registration mode. In the registration mode, when the optical encoder 300 is at the original position (e.g. indicated as 0 degree herein) or a specific position (e.g. indicated as 45 degrees, 90 degrees, 135 degrees, 180 degrees, 225 degrees, 270 degrees or 315 degrees herein) defined by the knob, the frame processing result is recorded to be served as a comparison reference value (i.e. the reference data mentioned above) for being compared when the optical encoder 300 passes the positions again. It is appreciated that said specific positions may be defined according to the moving vector, moving position, rotation time or rotation angle mentioned above.

The difference between FIG. 3b and FIG. 3a is that in FIG. 3b the detection surface 302b has simple markers, e.g. the marker 304a on the detection surface 302b indicating a specific position or angle of the knob such as an original position. In the registration mode, when the optical encoder 300 firstly detects reflected light from the marker 304a and generates a detected signal, the frame processing result is stored as reference data. Then in the comparison mode, each time when the optical encoder 300 passes the marker 304a, the light sensing unit 103 thereof detects the reflected light from the marker 304a and generates a detected signal. The processing unit 105 then generates the frame processing result according to the detected signal. As the frame processing result includes the feature of the marker 304a, the optical encoder 300 then outputs this frame processing result which is then compared with the reference data to identify whether the knob is rotated to the original position.

Similarly, the detection surface 302b may have a plurality of markers, e.g. 304b, 304c and so on, to indicate different positions or angles of the knob. In the comparison mode, when the optical encoder 300 passes these markers, frame processing results generated by the processing unit 105 include features of each of the markers to identify a current position or angle of the knob accordingly. These positions or angles may be applied to different controls, e.g. different positions indicating different volumes, different adjusting ranges and so on. It is appreciated that the number and the position of the reference positions in FIGS. 3a and 3b may be determined according to the required angle resolution and not limited to those described in the present disclosure.

Figure 4:
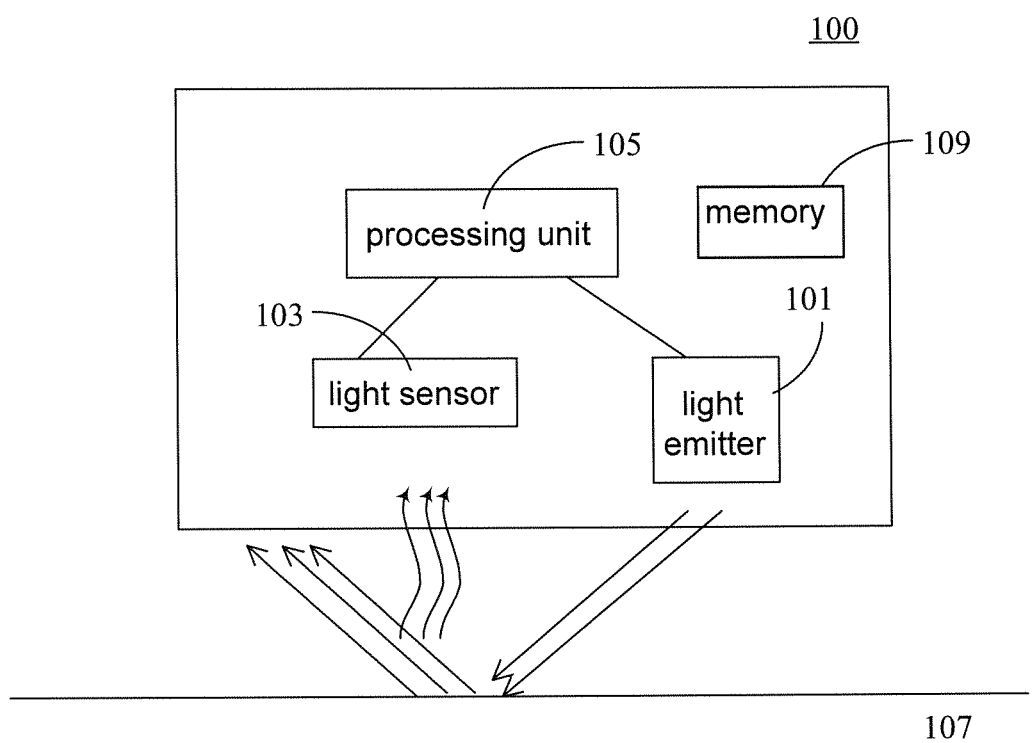
FIG. 4 is another embodiment of the present disclosure.

FIG. 4 is another embodiment of the present disclosure, which is different from the embodiment of FIG. 1 in that a memory unit 109 is further included in this embodiment. The memory unit 109 is configured to record at least one frame processing result (i.e. reference data) to be served as the basis for the following encoding process.

Figure 5:
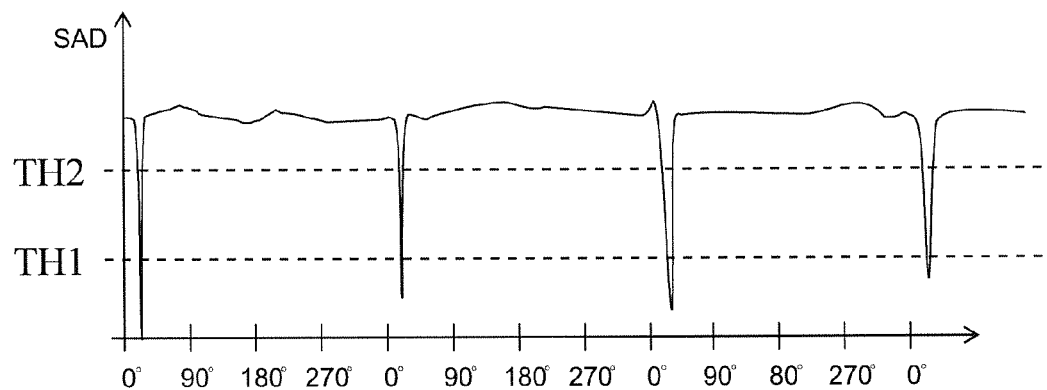
FIG. 5 is a schematic diagram of outputted signals when the present invention is applied to a working surface without any marker.

FIG. 5 is a schematic diagram of the signal comparison result when the present invention is applied to a detection surface (e.g. 302a) without any marker. Referring to FIG. 3a together, the transverse axis of FIG. 5 indicates rotation angles of a knob and the longitudinal axis indicates the frame identification result generated by the optical encoder 300, and this result may be represented by various numerical values, e.g. a sum of absolute difference (SAD) between the comparison image data and the reference data. When the sum of absolute difference is larger, it means that the current frame identification result detected by the optical encoder 300 has a larger difference from the comparison reference value, i.e. the optical encoder 300 is not at the specific position to be identified. In the example shown in FIG. 5, it is assumed that an angle of 20 degrees is the specific position to be aligned by the optical encoder 300. The optical encoder 300 captures a frame (image) when the knob is rotated at the position indicating 20 degrees on the detection surface, and the frame identification result is recorded as a comparison reference value, i.e. performing the registration mode. Then in the followed comparison mode, when the optical encoder 300 passes the position of 20 degrees again, the sum of absolute difference along the longitudinal axis significantly decreases. It means that the current frame identification result detected by the optical encoder 300 almost has no difference from the comparison reference value, i.e. the optical encoder 300 being aligned to the position of 20 degrees. The similar method may be adapted to the application having a plurality of comparison reference values. In one embodiment, the sum of absolute difference may be compared with an identification threshold TH1, and when the sum of absolute difference is smaller than the identification threshold TH1, it is able to identify that the rotation angle is at 20 degrees. In addition, in this embodiment the optical encoder 300 does not store the reference data corresponding to other angles. At other angles, as the sums of absolute difference are larger than the identification threshold TH1, the optical encoder 300 may define the angles at which the sum of absolute difference between the comparison image data and the reference data exceeds the threshold TH1 as unidentified angles or positions. And no control signal is generated corresponding to the unidentified angles or positions.

In addition, as mentioned above when the sums of absolute difference detected by the optical detector 300 corresponding to all angles are larger than the identification threshold TH1, i.e. the sum of absolute difference between the comparison image data at the current position and the reference data also exceeding the identification threshold TH1, it means that a part of the reference data (e.g. shown in FIG. 2e) may need to be updated. Then the optical encoder 300 may update the stored reference data. In another embodiment, when the fixed noise increases, the sum of absolute difference corresponding to most angles may decrease, and thus the update condition may be set as when the sums of absolute difference corresponding to a part of angles are smaller than an update threshold TH2, i.e. the sums of absolute difference between a part of the comparison image data (not at the current position) with the reference data are smaller than the update threshold TH2, the optical encoder 300 may update at least a part of the reference data being stored, wherein the number of angles or positions at which the sum of absolute difference is smaller than the update threshold TH2 may be determined according to the system tolerance.

In addition, when the optical encoder 300 is rotated by a fixed angle step, an error accumulation may occur when continuously operating in a same rotating direction. For example, FIG. 5 shows that the sum of absolute difference at the angle of 20 degrees gradually increases during continuous operation, and thus in the comparison mode the processing unit 105 may further calculate a position difference between the comparison image data and the reference data to accordingly correct an accumulated error. For example, it is able to calculate a position difference between the optimum comparison image (e.g. at 20 degrees) and the reference data, and record an accumulated position difference of the position difference during continuous operation. When the accumulated position difference exceeds the fixed angle step, the optical encoder may be corrected by one angle step.

Figure 6:
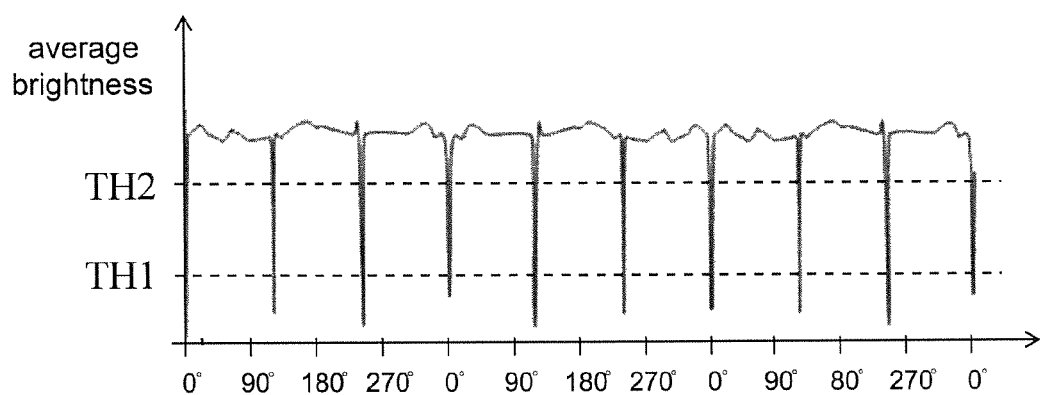
FIG. 6 is a schematic diagram of outputted signals when the present invention is applied to a working surface with markers.

FIG. 6 is a schematic diagram of the signal comparison result when the present invention is applied to a detection surface (e.g. 302b) with the marker(s). Referring to FIG. 3b together, the transverse axis of FIG. 6 indicates rotation angles of a knob and the longitudinal axis indicates the frame identification result generated by the optical encoder 300. In applying to the detection surface with the marker (e.g. 302b), the frame processing result may be represented by various parameter value, e.g. average brightness value. Corresponding to the material characteristic of the marker, the marker may be arranged to have a specific reflective brightness. When the average brightness value is smaller or larger (e.g. smaller shown in FIG. 6), it means that a current frame detected by the optical encoder 300 is identified to have the marker, i.e. the optical encoder 300 is at the specific position to be identified. Similarly, an identification threshold TH1 and/or an update threshold TH2 may be set previously in FIG. 6 to be served as the basis for identifying positions (angles) or updating reference data.

In applying the present invention, the optical encoder may further include a memory unit configured to store the frame data and/or frame processing result and relative information associated with every specific position. In addition, the optical encoder may further include a wired or wireless communication interface configured to communicate the relative information with other hardware, e.g. activated by receiving a control signal from the host or sending the comparison result to other hardware. For example, the reference data may be stored in the optical encoder or in an external host. When the reference data is stored in the optical encoder, the optical encoder directly identifies the position or angle and outputs a control signal to the controlled device or a host. When the reference data is stored in an external host of the optical encoder, the optical encoder may output the encoded data (i.e. the comparison image data) to the host to allow the host to perform the identification of the position or angle.

In order to apply the present invention to the embodiment that has a faster speed of relative motion with respect to the detection surface, preferably the frame rate of the present invention is higher than 1,000 frames per second. Meanwhile, according to different material of the detection surface, it is able to set different emitting power or emitting frequencies, or adaptively adjust the emitting power or emitting frequency according to the brightness or dark parameter detected by the light sensing unit.

In applying the present invention, the light sensing unit may include a light sensing array composed of a plurality of sensing pixels, e.g. a square light sensing matrix composed of 30×30 pixels or a rectangular light sensing matrix having different side lengths. The actual size of the light sensing array is determined according to the pixel number and pixel size, and is adjustable according to the resolution required by the system.

In other embodiments, the optical sensing matrix may activate or deactivate a part of sensing pixels according to the system requirement. For example, in a light sensing matrix composed of 36×36 pixels, it is able to activate all sensing pixels or activate only a part of sensing pixels, e.g. a sub-matrix of 18×18 pixels is activated, or to activate sensing pixels separated by one deactivated sensing pixel. In this manner, although the detectable range or the sensing resolution of the light sensing matrix is decreased, power consumption is reduced.

It should be mentioned that although a reflective optical encoder is taken as an example in the above embodiments, i.e. the light emitting unit and the light sensing unit arranged at the same side of the detection surface, a transmissive optical encoder is possible when the detection surface is made of light transparent or translucent material, i.e. the light emitting unit and the light sensing unit arranged at different sides of the detection surface. In addition to the disposed positions of the light emitting unit and the light sensing unit are different, the operating method is similar to the above embodiments and thus details thereof are not described herein.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical encoder, comprising:
   a light emitter having a contact point and configured to emit light to a detection surface;
   a light sensing matrix having a plurality of pixels and configured to detect reflected light from the detection surface to generate detected signals; and
   a processing unit coupled to the contact point of the light emitter, and configured to
      store reference data corresponding to at least one reference position in a registration mode according to the detected signals,
      generate comparison image data according to the detected signals in a comparison mode and compare the comparison image data with the reference data to determine a current position, and
      update at least a part of the reference data in the comparison mode when a difference value between the comparison image data corresponding to the current position and the reference data exceeds an identification threshold or when a difference value between the comparison image data other than the current position and the reference data is smaller than an update threshold.

2. The optical encoder as claimed in claim 1, wherein, in the registration mode, the processing unit is configured to identify an operation range between a start position being repeatedly detected as the at least one reference position.

3. The optical encoder as claimed in claim 1, wherein the processing unit stores a plurality of reference data corresponding to a plurality of reference positions, and in the comparison mode
   when identifying that a previous comparison result exists, the processing unit is configured to compare the comparison image data with the reference data within a predetermined range of the previous comparison result; and
   when identifying that the previous comparison result does not exist, the processing unit is configured to compare the comparison image data with all the plurality of reference data.

4. The optical encoder as claimed in claim 1, wherein, in the comparison mode, the processing unit is further configured to calculate a position difference between the comparison image data and the reference data to accordingly correct an accumulated error.

5. The optical encoder as claimed in claim 1, wherein, in the comparison mode, the processing unit is configured to compare gray value differences or average gray values between the comparison image data and the reference data.

6. The optical encoder as claimed in claim 1, wherein, in the comparison mode, the processing unit is further configured to identify positions, other than the current position, at which the difference value between the comparison image data and the reference data exceeds the identification threshold as unidentified positions.

7. An operating method of an optical encoder, the optical encoder comprising a light sensing unit configured to detect reflected light from a detection surface to generate detected signals and a processing unit configured to process the detected signals, the operating method comprising:
   entering a registration mode in which the processing unit stores reference data corresponding to at least one reference position according to the detected signals;
   entering a comparison mode in which the processing unit generates comparison image data according to the detected signals and compares the comparison image data with the reference data to determine a current position; and
   updating, in the comparison mode, at least a part of the reference data when a difference value between the comparison image data corresponding to the current position and the reference data exceeds an identification threshold or when a difference value between the comparison image data other than the current position and the reference data is smaller than an update threshold.

8. The operating method as claimed in claim 7, wherein, in the registration mode, the operating method further comprises:
   rotating the optical encoder on the detection surface to capture images of the detection surface and calculating moving vectors or moving distances; and
   identifying a plurality of reference positions of the detection surface according to the moving vectors or the moving distances.

9. The operating method as claimed in claim 8, wherein, in the comparison mode, the operating method further comprises:
   rotating the optical encoder on the detection surface to capture images of the detection surface and generating the comparison image data;
   comparing the comparison image data with the reference data to obtain an optimum comparison result as the current position; and
   outputting a control signal according to the optimum comparison result.

10. The operating method as claimed in claim 9, wherein, in the comparison mode, the operating method further comprises:
    when identifying that a previous comparison result exists, comparing the comparison image data with the reference data within a predetermined range of the previous comparison result; and
    when identifying that the previous comparison result does not exist, comparing the comparison image data with all the reference data.

11. The operating method as claimed in claim 7, wherein, in the comparison mode, the operating method further comprises:
    calculating a position difference between the comparison image data and the reference data to accordingly correct an accumulated error.

12. The operating method as claimed in claim 7, wherein, in the comparison mode, the operating method further comprises:
    identifying positions, other than the current position, at which the difference value between the comparison image data and the reference data exceeds the identification threshold as unidentified positions.

13. An optical encoder, comprising:
    a light emitter having a contact point and configured to emit light to a detection surface;

a light sensing matrix having a plurality of pixels and configured to detect reflected light from the detection surface to generate images; and a processing unit coupled to the contact point of the light emitter, wherein the processing unit is configured to, in a registration mode, identify a start position repeatedly detected according to the images to determine an operation range, and store reference data corresponding to an original position and at least one reference position within the operation range, wherein the processing unit is further configured to, in a comparison mode, generate comparison image data according to the images, and compare the comparison image data with the reference data to accordingly determine a current position, and wherein the processing unit is further configured to update at least a part of the reference data when a difference value between the comparison image data corresponding to the current position and the reference data exceeds an identification threshold, or when a difference value between the comparison image data other than the current position and the reference data is smaller than an update threshold.

14. The optical encoder as claimed in claim 13, wherein the processing unit is configured to identify the original position and the at least one reference position of the operation range according to a moving vector, a moving distance, a rotation angle or a rotation time.

\* \* \* \* \*